US009489566B2

(12) United States Patent
Yano et al.

(10) Patent No.: US 9,489,566 B2
(45) Date of Patent: Nov. 8, 2016

(54) IMAGE RECOGNITION APPARATUS AND IMAGE RECOGNITION METHOD FOR IDENTIFYING OBJECT

(71) Applicant: CANON KABUSHIKI KAISHA, Tokyo (JP)

(72) Inventors: Kotaro Yano, Tokyo (JP); Ichiro Umeda, Tokyo (JP); Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/967,044

(22) Filed: Aug. 14, 2013

(65) Prior Publication Data
US 2014/0140583 A1 May 22, 2014

(30) Foreign Application Priority Data

Aug. 22, 2012 (JP) ................................ 2012-183456

(51) Int. Cl.
G06K 9/00 (2006.01)
G06K 9/46 (2006.01)
G06K 9/62 (2006.01)

(52) U.S. Cl.
CPC ....... *G06K 9/00288* (2013.01); *G06K 9/00268* (2013.01); *G06K 9/4642* (2013.01); *G06K 9/6212* (2013.01); *G06K 9/6269* (2013.01)

(58) Field of Classification Search
None
See application file for complete search history.

(56) References Cited

U.S. PATENT DOCUMENTS

| | | | |
|---|---|---|---|
| 2003/0103652 A1* | 6/2003 | Lee et al. ...................... | 382/118 |
| 2006/0274949 A1* | 12/2006 | Gallagher et al. ............ | 382/228 |
| 2009/0074259 A1* | 3/2009 | Baltatu et al. ................ | 382/118 |
| 2011/0188706 A1* | 8/2011 | Zhou ............................. | 382/103 |
| 2011/0243461 A1* | 10/2011 | Nayar et al. .................. | 382/224 |
| 2012/0070041 A1* | 3/2012 | Wang ..................... | G06F 21/32 382/118 |

FOREIGN PATENT DOCUMENTS

JP 11-175718 A 7/1999

OTHER PUBLICATIONS

Shan, Caifeng, and Tommaso Gritti. "Learning Discriminative LBP—Histogram Bins for Facial Expression Recognition." BMVC. 2008.*
Osuna, Edgar, Robert Freund, and Federico Girosi. "Training support vector machines: an application to face detection." Computer vision and pattern recognition, 1997. Proceedings., 1997 IEEE computer society conference on. IEEE, 1997.*
Paul Viola, et al., "Rapid Object Detection using a Boosted Cascade of Simple Features", Accepted Conference on Computer Vision and Pattern Recognition 2001, pp. 1-9.
Okada et al., "A note on improvement of classification performance based on SVDD including target object detection scheme"; ITE Technical Report, Feb. 14, 2011, vol. 35, No. 9, pp. 113-117.

* cited by examiner

*Primary Examiner* — Andrew Moyer
(74) *Attorney, Agent, or Firm* — Canon U.S.A., Inc. IP Division (57) ABSTRACT

There are provided an image recognition apparatus and an image recognition method according to which, when registering a face model for a face image, face images are sequentially acquired from frames of a moving image, feature amounts are extracted from the sequentially acquired face images, and a hypersphere defined by Support Vector Data Description (SVDD) is obtained from the group of training samples. Then, training samples in a boundary region of the hypersphere are registered as boundary samples. When performing matching of a face image of a recognition target, the reliability is calculated using the boundary samples, and a person with the highest reliability is output as a recognition result.

9 Claims, 9 Drawing Sheets

IMAGE RECOGNITION APPARATUS AND IMAGE RECOGNITION METHOD FOR IDENTIFYING OBJECT

BACKGROUND OF THE INVENTION

1. Field of the Invention

The present invention relates particularly to an image recognition apparatus and a method suitable for identifying an object with high accuracy.

2. Description of the Related Art

Conventionally, there is known a face recognition technique for identifying an individual by extracting a face region from an image including a face of a person as a face image, and comparing the extracted face image with a face image of a specific person registered in advance. This face recognition technique is used for security, such as allowing entrance into a room when a person captured by a camera is recognized as a registered person, for example.

On the other hand, there is a desire to perform, using the face recognition technique, image search for a photograph showing the same person. Regarding the security use, recognition with high accuracy is enabled by imposing restrictions on the conditions for capturing a person, but with the case of image search, conditions for capturing a person are varied, and there is a problem that the recognition accuracy is low. For example, even if the same person is shown in photographs, the person may be erroneously determined to be different persons depending on the orientations or expressions of the faces, or the illumination at the time of capturing.

Accordingly, a method for registering a plurality of face images is discussed as a method for performing recognition with high accuracy even when the conditions for capturing the face images are different. For example, Japanese Patent Application Laid-Open No. 11-175718 discusses a method for creating partial spaces from a plurality of face images, and performing recognition based on the similarity between the partial spaces of a registered face and an input face.

On the other hand, Support Vector Data Description (SVDD) is known as a method for performing representation by using a smallest hypersphere containing samples of a class to which a target belongs from a plurality of samples of an identification target (for example, see "Support Vector Data Description" by D. Tax and R. Duin, Machine Learning, 54(1):45-66, 2004). Also, "Support Vector Data Description for Image Categorization From Internet Images" by X. Yu, D. DeMenthon and D. Doermann, 19th International Conference on Pattern Recognition, 2008 discusses a classification method for general object categories using SVDD.

However, according to the method for performing face recognition using partial spaces as discussed in Japanese Patent Application Laid-Open No. 11-175718, a plurality of face images has to be input, and the amount of processing is increased to that extent. Also, even if a face image of the same person as the registered face image is input, the persons may not be identified as the same person. This is because if the expanse of the partial spaces of the registered face image and the input face image are large, the similarity between the partial spaces will not be necessarily high. Also, erroneous recognition is likely to occur due to overlapping of partial spaces caused by an increase in the number of classes. Such characteristics are particularly likely when the number of samples for the registered face image is small.

On the other hand, when the method discussed in "Support Vector Data Description for Image Categorization From Internet Images" described above is applied to face recognition, the problems described above can be overcome because a sample near an identification boundary of a registered face image is extracted as a support vector. However, if SVDD is simply applied, although whether an input sample is of a target category can be identified, the reliability belonging to the category cannot be obtained. Accordingly, when a plurality of people who resemble each other are registered, the most similar person cannot be output as the identification result.

SUMMARY OF THE INVENTION

The present invention is directed to an image recognition apparatus and an image recognition method capable of recognizing an object with high accuracy from a plurality of registered images.

According to an aspect of the invention, an image recognition apparatus includes an acquisition unit configured to acquire an object image, a feature extraction unit configured to extract a feature amount from the object image acquired by the acquisition unit, a registration unit configured to set feature amounts extracted by the feature extraction unit from a plurality of object images including a same object as a group of training samples, and determine a training sample that is present near a boundary of a class containing the group of training samples, and to register the determined training sample and a parameter for determining the training sample that is present near the boundary, a calculation unit configured to calculate, based on the feature amount extracted by the feature extraction unit from the object image of a recognition target acquired by the acquisition unit and on the training sample and the parameter registered by the registration unit, a reliability for each class with respect to the object image of the recognition target, and an identification unit configured to recognize the object based on the reliability of each class calculated by the calculation unit and outputs a recognition result.

Further features of the present invention will become apparent from the following description of exemplary embodiments with reference to the attached drawings.

DESCRIPTION OF THE EMBODIMENTS

In the following, an exemplary embodiment of the present invention will be described. In the present exemplary embodiment, an example of performing individual identification through face based on a plurality of face images will be described.

Figure 1:
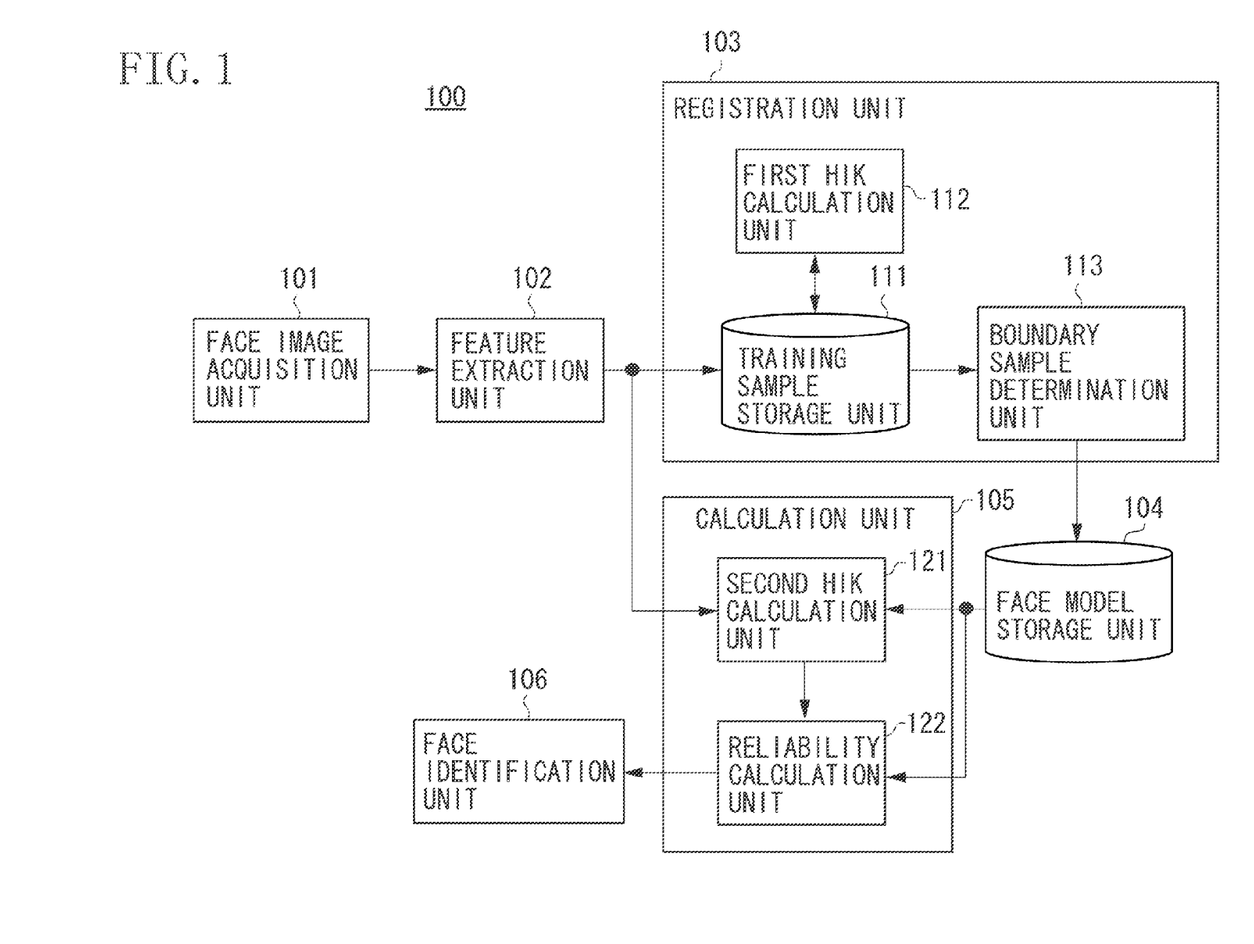
FIG. 1 is a block diagram illustrating an example functional configuration of an image recognition apparatus according to an exemplary embodiment.

FIG. 1 is a block diagram illustrating an example functional configuration of an image recognition apparatus 100 according to the present exemplary embodiment. Referring to FIG. 1, a face image acquisition unit 101 includes an image capturing apparatus for acquiring image data, and an image processing apparatus for clipping a face region from the acquired image data and outputting face image data. A feature extraction unit 102 obtains a feature amount used for performing individual identification through face based on the face image data acquired by the face image acquisition unit 101.

A registration unit 103 extracts face models used for performing face identification for individuals, from the feature amounts of a plurality of faces obtained by the feature extraction unit 102. Furthermore, the registration unit 103 includes a training sample storage unit 111, a first HIK calculation unit 112, and a boundary sample determination unit 113. A face model storage unit 104 is a memory for storing the face model of each individual obtained by the registration unit 103.

A calculation unit 105 inputs the feature amount extracted by the feature extraction unit 102, and obtains reliability of the input feature amount, which is of a class of a face model, based on the face models registered in the face model storage unit 104. The calculation unit 105 includes a second HIK calculation unit 121 and a reliability calculation unit 122. Additionally, since the first HIK calculation unit 112 and the second HIK calculation unit 121 have a same function, the second HIK calculation unit 121 may be substituted by the first HIK calculation unit 112 of the registration unit 103. A face identification unit 106 performs face identification for a plurality of individuals based on the reliabilities output from the calculation unit 105.

Next, an operation of the present exemplary embodiment will be described. First, a process for registering a face model for a face image will be described with reference to FIGS. 2 to 5.

Figure 2:
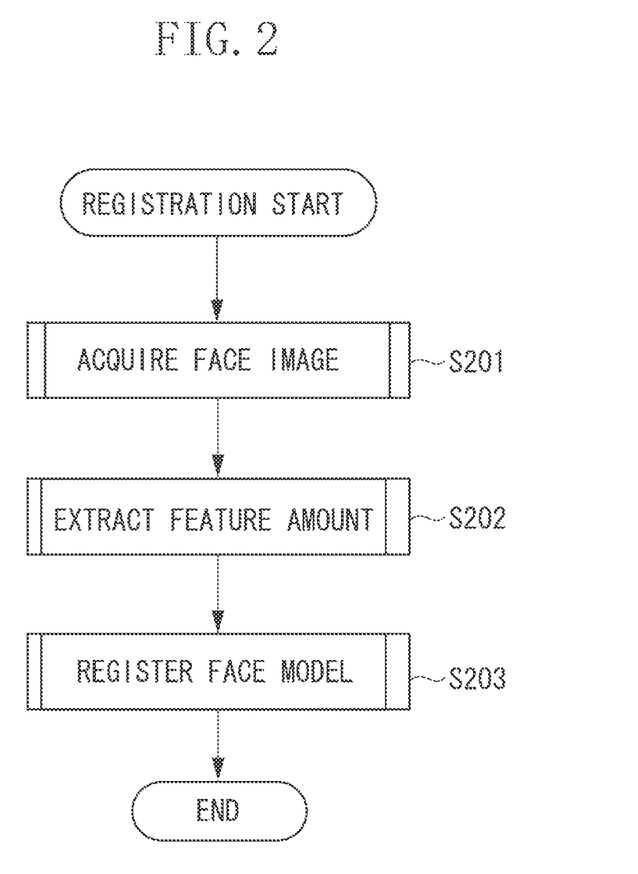
FIG. 2 is a flow chart illustrating an example of a procedure for registering a face image.

FIG. 2 is a flow chart illustrating an example of a procedure for registering a face model for a face image. In the present exemplary embodiment, since a feature amount is extracted from a plurality of frames included in a moving image, the processes in steps S201 and S202 are performed every time a frame is input.

Referring to FIG. 2, first, in step S201, the face image acquisition unit 101 acquires an object image (a face image). Details of the process in step S201 will be described with reference to the flow chart in FIG. 3 below.

Figure 3:
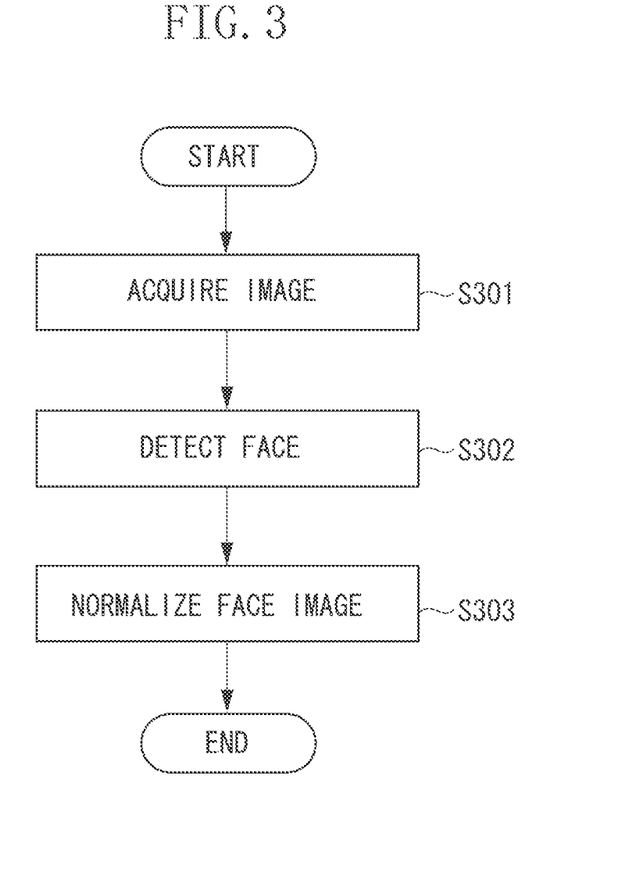
FIG. 3 is a flow chart illustrating an example of a detailed procedure for acquiring a face image.

FIG. 3 is a flow chart illustrating an example of a detailed procedure by the face image acquisition unit 101 to acquire a face image in step S201 in FIG. 2.

First, the face image acquisition unit 101 captures a face of a person to be registered to capture a moving image, clips the moving image frame by frame, and acquires image data in the form of a still image. Then, in step S301, the face image acquisition unit 101 stores the acquired image data in a memory of the face image acquisition unit 101. The image data to be acquired here is a luminance image, and when a color image in RGB is acquired, the color image is stored after being transformed into a luminance image.

Then, in step S302, the face image acquisition unit 101 obtains the precise position and size of a face region from the image data acquired in step S301. Specifically, the face image acquisition unit 101 obtains the position of a face region in an image by the face detection method discussed in "Rapid Object Detection using Boosted Cascade of Simple Features" by P. Viola and M. Jones, Proceedings of the IEEE Conference on Computer Vision and Pattern Recognition (CVPR2001), for example.

Next, in step S303, the face image acquisition unit 101 normalizes the face image based on the position and the size of the face detected in step S302. More specifically, the face image acquisition unit 101 performs geometric transformation in such a manner that the detected face region is at a predetermined arrangement and with a predetermined size. For example, the face image acquisition unit 101 performs transformation in such a manner as to obtain a 100×100 pixel face image where the positions of the eyes are at predetermined positions in the image. Then, the face image acquisition unit 101 outputs the normalized face image, and ends the process.

Returning to FIG. 2, next, in step S202, the feature extraction unit 102 extracts a feature amount representing the feature of the face from the normalized face image. Details of the process in step S202 will be described with reference to the flow chart in FIG. 4 below.

Figure 4:
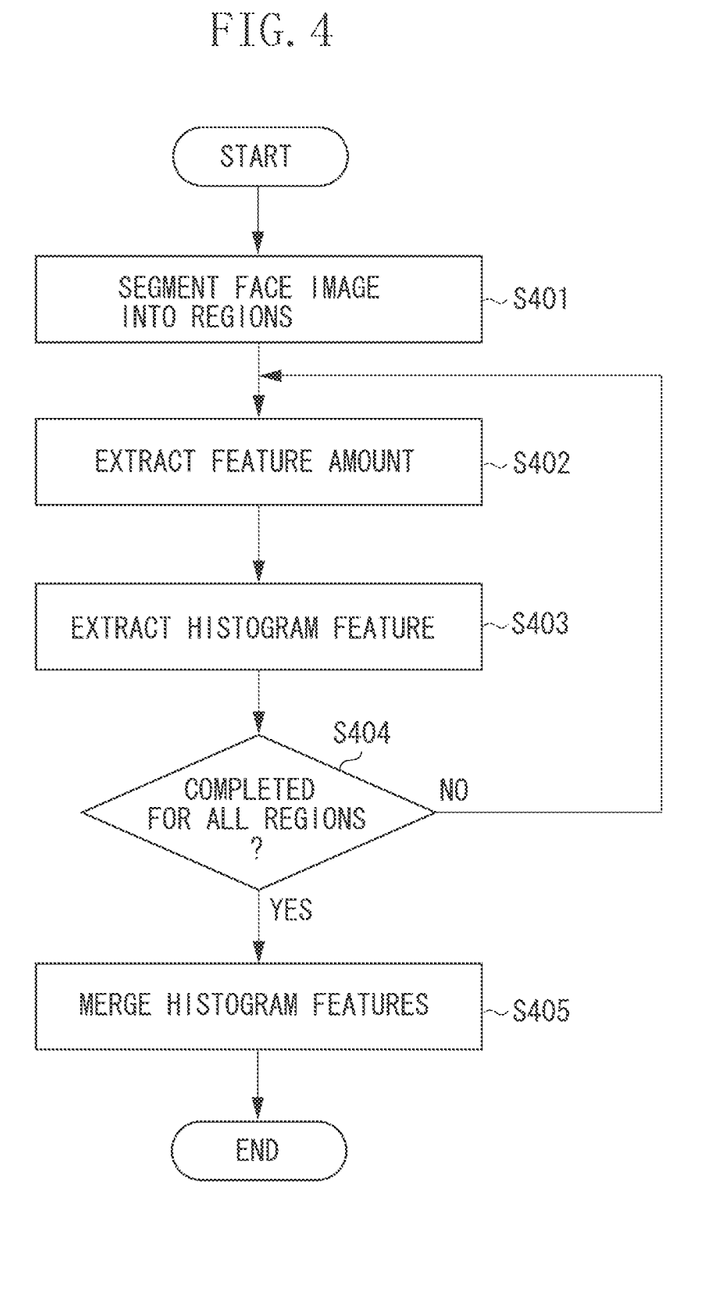
FIG. 4 is a flow chart illustrating a detailed procedure for extracting a feature amount.

FIG. 4 is a flow chart illustrating an example of a detailed procedure performed by the feature extraction unit 102 to extract the feature amount in step S202 in FIG. 2.

Figure 6:
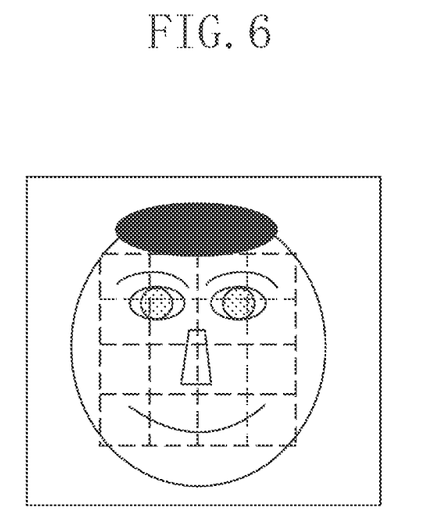
FIG. 6 is a diagram illustrating segmentation of a face image into regions.

First, in step S401, the feature extraction unit 102 segments the input face image into regions. In this process, the feature extraction unit 102 segments the input face image into blocks which are rectangular regions having the same size horizontally and vertically, as illustrated in FIG. 6. At this time, the feature extraction unit 102 performs segmentation to obtain 4×4 regions where one block is 25×25 pixels, for example. Alternatively, the feature extraction unit 102 may perform segmentation while changing the shape or the size of the region depending on the position such as an eye, a mouth or a nose in the face, or the regions may overlap one another.

Next, in step S402, the feature extraction unit 102 extracts the feature amounts from the regions segmented in step S401. In the present exemplary embodiment, the feature extraction unit 102 obtains a Local Binary Pattern (LBP) feature amount as the feature amount. The LBP feature amount is obtained by encoding the increase or decrease in the luminance of a neighboring pixel, as discussed in "Learning Discriminative LBP-Histogram Bins For Facial Expression Recognition" by C. Shan and T. Gritti, In Proc. British Machine Vision Conference, 2008, for example. The LBP feature amount is effective for face recognition, and is robust to illumination variations.

Next, in step S403, the feature extraction unit 102 obtains the distribution of the feature amounts extracted in step S402 within a region, and extracts the distribution as a histogram feature. More specifically, the feature extraction unit 102 obtains the frequency for each encoded value of the LBP feature amount obtained in step S402, and the frequency distribution is given as the histogram feature. Additionally, for example, the feature extraction unit 102 may extract other histogram features by obtaining a luminance gradient in step S402, and extracting the histogram in step S403 to extract a Histogram of Oriented Gradients (HOG) feature amount. Incidentally, when the sum of the histogram features extracted at this time fluctuates, the extracted histogram features are normalized so that the sum will be invariant.

Next, in step S404, the feature extraction unit 102 determines whether the processes in steps S402 and S403 have been performed for all the regions segmented in step S401. If there is still a region to be processed (NO in step S404), the operation returns to step S402, and the feature extraction unit 102 performs the processes on the next region. On the other hand, if all the regions have been processed (YES in step S404), the operation proceeds to step S405.

Next, in step S405, the feature extraction unit 102 merges all the histogram features of respective regions extracted in step S403, and outputs the merged feature amount. For example, when the number of regions which have been segmented in step S401 is $n_R$, and the number of bins of the histogram obtained in step S403 is $n_B$, the merged feature amount is a $n_R \times n_B$, dimensional feature amount.

Returning to FIG. 2, next, the registration unit 103 inputs a feature amount from the feature extraction unit 102, and stores the feature amount in the training sample storage unit 111 of the registration unit 103. Then, in step S203, the registration unit 103 extracts a face model from a plurality of sequentially input feature amounts, and registers the face model in the face model storage unit 104. A plurality of face models relating to the feature amounts of the face image of a same person can thereby be registered.

$$\min R^2 + C\Sigma_{i=0}^N \xi_i$$

$$s.t. \|\Phi(x_i) - a\|^2 \leq R^2 + \xi_i \quad (1)$$

Here, R is the radius of a hypersphere, a is the center of the hypersphere, $\xi_i$ is a slack variable, $\Phi$ is non-linear mapping to a high-dimensional feature space, and C is a parameter for controlling tradeoff between the volume of the hypersphere and the number of samples outside the hypersphere. Also, when introducing Lagrange multiplier $\alpha_i \geq 0$, Equation (1) may be expressed as a problem for solving Equation (2) below.

$$\min_\alpha \Sigma_{i,j} \alpha_i \alpha_j K(x_i, x_j) - \Sigma_i \alpha_i K(x_i, x_i)$$

$$s.t. 0 \leq \alpha_i \leq C, \Sigma_i \alpha_i = 1 \quad (2)$$

Here, $K(x_i, x_j) = (\Phi(x_i), \Phi(x_j))$ is a kernel function. Of the Lagrange multipliers $\alpha_i$ satisfying Equation (2), the sphere may be represented by a sample corresponding to a non-zero coefficient, and according to SVDD, these training samples near the boundary of the sphere are extracted as support vectors (boundary samples). Here, when taking the distance of an input sample z to the center of the hypersphere as R, the following Equation (3) is established.

$$R_z^2 = K(z,z) - 2\Sigma_{i=1}^{N_{SV}} \alpha_i K(x_i, z) + \Sigma_{i=1}^{N_{SV}} \Sigma_{j=1}^{N_{SV}} \alpha_i \alpha_j K(x_i, x_j) \quad (3)$$

Here, $N_{SV}$ represents the number of extracted support vectors, and $\Sigma$ represents the sum of the extracted support vectors.

Figure 5:
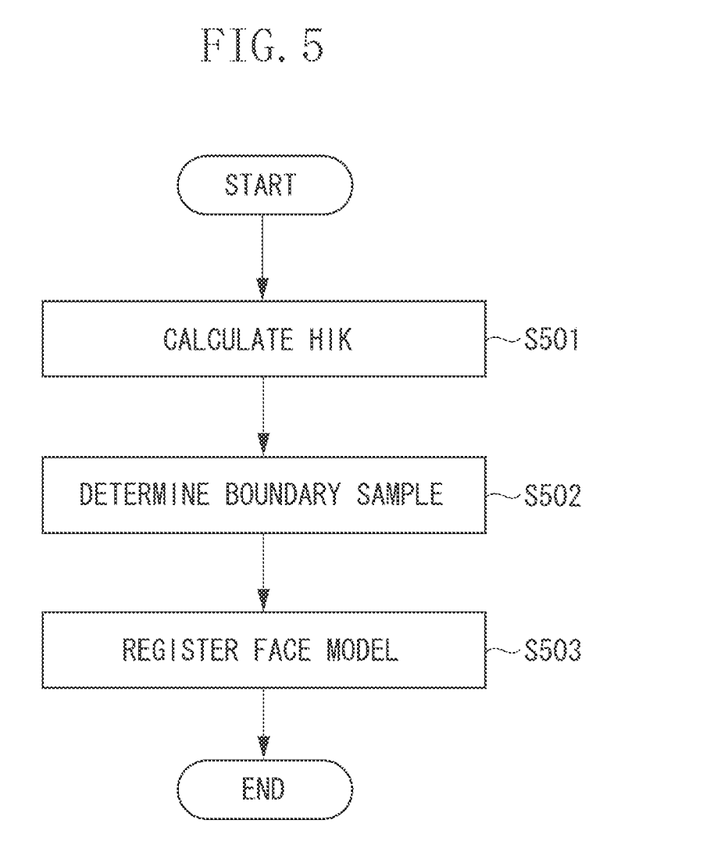
FIG. 5 is a flow chart illustrating an example of a detailed procedure for registering a face model.

FIG. 5 is a flow chart illustrating an example of a detailed procedure performed by the registration unit 103 to register a face model in step S203 in FIG. 2.

First, in step S501, the first HIK calculation unit 112 calculates a Histogram Intersection Kernel (HIK) from a plurality of feature amounts extracted by the feature extraction unit 102. The HIK is calculated by using the following Equation (4).

$$K(x_i, x_j) = \Sigma_{l=1}^d \min(x_{il}, x_{jl}) \quad (4)$$

Here, $x_{il}$ and $x_{jl}$ are first features of feature amounts $x_i$ and $x_j$, respectively, and d is the dimension of a feature amount, and min( ) is a function returning a smaller value. In this manner, in the present exemplary embodiment, the HIK is used as the kernel function for SVDD, and the calculated value is stored in the training sample storage unit 111 to be used in the next step S502.

Next, in step S502, the boundary sample determination unit 113 determines a boundary sample by SVDD from the value of HIK of the feature amounts obtained in step S501. In other words, of the Lagrange multipliers $\alpha_i$ satisfying Equation (2) described above, a training sample corresponding to a non-zero coefficient is determined to be the support vector (boundary sample).

Next, in step S503, the registration unit 103 registers a training sample $x_i$ determined to be the boundary sample in step S502 and the Lagrange multiplier $\alpha_i$ in the face model storage unit 104 as a face model.

Heretofore, an operation of creating a moving image by capturing the face of a person, and registering a face model has been described. Additionally, when registering the face models for a plurality of persons, the processes described above are repeated. Since, at the time of registering a face image (a face model), registration is performed using a moving image where there is a great variation in the orientation and expression of the face, the registered person may be modeled in various ways. Therefore, it is possible to perform recognition with high accuracy.

Next, a process for inputting the face image of a person who is a recognition target, and check matching between the face image and a registered face image will be described with reference to FIGS. 7 to 9.

Figure 7:
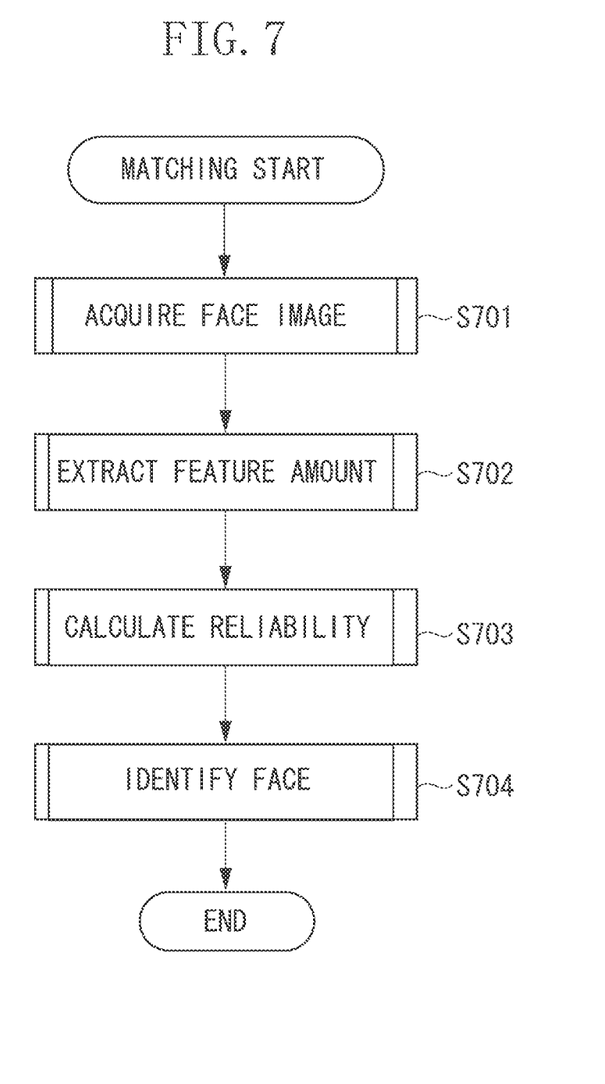
FIG. 7 is a flow chart illustrating an example of a procedure for identifying an input face image.

FIG. 7 is a flow chart illustrating an example of a procedure for identifying an input face image.

First, in step S701, the face image acquisition unit 101 acquires a face image of a person who is a recognition target. Then, in step S702, the feature extraction unit 102 extracts a feature amount representing the feature of the face from the acquired face image. The processes in steps S701 and S702 in FIG. 7 are the same as the processes in steps S201 and S202 performed at the time of registration of a face image. Additionally, when the feature extraction unit 102 extracts a feature amount, the information is output to the calculation unit 105.

Next, in step S703, the calculation unit 105 inputs the feature amount extracted by the feature extraction unit 102, and calculates the reliability of the feature amount being of the class of a face model, based on the face model registered in the face model storage unit 104. Details of the process in step S703 will be described with reference to the flow chart in FIG. 8 below.

Figure 8:
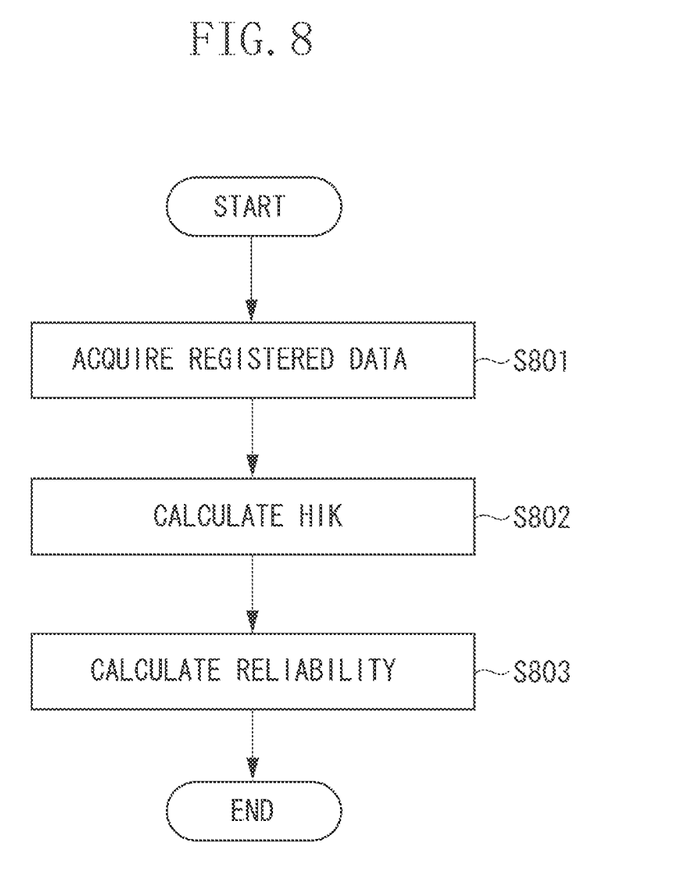
FIG. 8 is a flow chart illustrating a detailed procedure of obtaining reliability.

FIG. 8 is a flow chart illustrating an example of a detailed procedure for the calculation unit 105 to calculate the reliability in step S703 in FIG. 7.

First, in step S801, the calculation unit 105 acquires registered data (face model) to be checked matching, from the face model storage unit 104. Next, the second HIK calculation unit 121 calculates the HIK from the input feature amount and a boundary sample of the registered data acquired in step S801. The HIK is calculated by the following Equation (5).

$$K(x_i, z) = \Sigma_{l=1}^d \min(x_{il}, z_l) \quad (5)$$

Here, $x_i$ is a boundary sample of registered data, z is an input feature amount, and $x_{il}$ and $z_l$ are first features of $x_i$ and z, respectively. In step S802, the second HIK calculation unit 121 calculates the HIK for all the boundary samples of the registered data, and outputs a sum weighted with the coefficient $\alpha_i$ to the reliability calculation unit 122.

Then, in step S803, the reliability calculation unit 122 calculates the reliability of the input feature amount being of the class of the registered face model, based on the output of step S802 and the registered data. In the following, a detailed method for calculating the reliability will be described. The reliability P of the input feature amount can be defined by the following Equation (6).

$$P = \frac{R_z^2 - R_{min}^2}{R_{max}^2 - R_{min}^2} \quad (6)$$

Here, $R_z$ is the distance of the input feature amount to the center of the hypersphere defined in Equation (3), and $R_{max}$ and $R_{min}$ are, respectively, the maximum value and the minimum value $R_z$ may take. Here, $R^2_{max}$ can be calculated by Equation (3) and the following Equation (7).

$$R_{max}^2 = K(z,z) + \Sigma_{i=1}^{NSV} \Sigma_{j=1}^{NSV} \alpha_i \alpha_j K(x_i, x_j) \quad (7)$$

In Equation (7), the term corresponding to the second term of Equation (3) is zero due to the property of HIK. Also, since K(z, z) will be a fixed value when a normalized histogram feature is used, $R^2_{max}$ can be calculated in advance at the time of extracting a boundary sample at the time of registration process. On the other hand, $R^2_{min}$ can be calculated by Equations (3), (7) and the following Equation (8).

$$R_{min}^2 = R_{max}^2 - 2 \max\_hik \quad (8)$$

Here, max_hik is the maximum value which the second term of Equation (3), $\Sigma \alpha_i K(x_i, z)$, may take. This max_hik is estimated by the following method. First, β in the following Equation (9) is calculated.

$$\beta = \frac{h_{mean}}{h_{mean\_max}} \quad (9)$$

$$h_{mean\_max} = \Sigma_{l=1}^{d} \Sigma_{i=1}^{NSV} \alpha_i x_{il}/d$$

where, $h_{mean}$ is a mean value obtained by dividing the sum of HIK output in step S802 by the number of dimensions of the feature amount, that is, a mean value of the sum of HIK for each bin of the histogram feature. Also, $h_{mean\_max}$ is the maximum value of the mean value of the sum of HIK for each bin of the histogram feature, and may be calculated in advance before the registration process. Since β represents the reliability of $h_{mean}$ due to the property of SVDD, and $h_{mean}$ is according to a normal distribution, the reliability interval of the reliability β may be calculated from the cumulative distribution function of the standard normal distribution. Then, the value obtained by multiplying the maximum reliability interval by the number of dimensions of the feature amount is made the estimated value of max_hik.

With the procedure described above, the reliability of an input feature amount can be calculated by Equation (6), based on the sum of HIK output from the second HIK calculation unit 121 and the registered data. Additionally, when there are a plurality of registered face models, the process in step S703 is repeated for each registered person, and respective reliabilities are obtained.

Next, in step S704, the face identification unit 106 performs face identification based on the output of the calculation unit 105 regarding a plurality of individuals. Details of the process in step S704 will be described with reference to the flow chart in FIG. 9.

Figure 9:
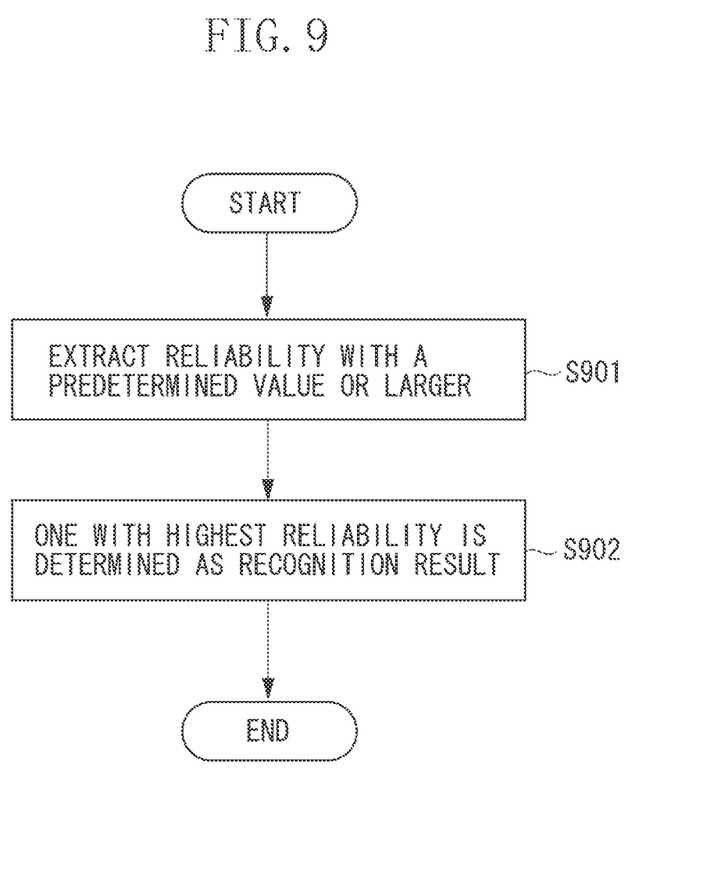
FIG. 9 is a flow chart illustrating a detailed procedure for identifying a person of an input face image.

FIG. 9 is a flow chart illustrating an example of a detailed procedure of the face identification unit 106 to identify a person of an input image in step S704 in FIG. 7.

First, in step S901, the face identification unit 106 extracts, among the reliabilities of respective persons calculated by the calculation unit 105, the reliabilities with a predetermined value or larger. Then, in step S902, the face identification unit 106 determines a person with the highest reliability, among the extracted reliabilities with the predetermined value or larger, as the recognition result. Additionally, when there is no reliability that has the predetermined value or larger, the face identification unit 106 determines that the person is not a registered person as a recognition result. Moreover, when there is a plurality of persons whose reliabilities are the predetermined value or larger, the face identification unit 106 may output these persons as the recognition result together with respective reliabilities, or may sort, in the order of the reliability, and output these persons.

As described above, according to the present exemplary embodiment, the reliability of a person related to an input face image being a registered person is calculated based on a feature amount obtained from the input face image and a boundary sample of a feature amount obtained from a registered face image. At this time, a face recognition result is obtained by calculating the reliability for each of a plurality of registered persons. Moreover, according to the present exemplary embodiment, a histogram feature is extracted from each face image, and the reliability is obtained based on HIK, and thus, a stable reliability can be obtained.

Additionally, according to the present exemplary embodiment, HIK is calculated with respect to a boundary sample in step S802 in FIG. 8 by Equation (5) as necessary, but the process may be further accelerated by the method discussed in "Classification using intersection kernel support vector machines are efficient" by S. Maji, A. C. Berg and J. Malik, Proceedings of the IEEE Conference on Computer Vision and Pattern Recognition (CVPR2008). In this case, maximum values that the histogram intersection can take are calculated in advance based on the boundary samples and parameters obtained by the procedure illustrated in FIG. 5, and a table is created by sorting the maximum values. Then, approximation using the table is performed in step S802 in FIG. 8 instead of using Equation (5).

Furthermore, the identification result by the face identification unit 106 obtained in the present exemplary embodiment can be fed back to the registration unit 103 to obtain a face model with higher accuracy. In this case, an input sample is added to a training sample for a person corresponding to the identification result, and the process in step S203 is performed to update the face model. At this time, if the distance $R_z$ of the input sample to the center of the hypersphere is smaller than the radius R of the hypersphere which can be represented by the boundary sample of the corresponding person, the input sample is within the hypersphere, and the face model does not have to be updated. Also, with respect to the values of HIK of the input sample and the boundary sample, the result obtained in step S802 at the time of matching process may be reused, and the boundary sample is determined in step S502 in FIG. 5, thereby enabling the update process to be efficiently performed.

Moreover, according to the present exemplary embodiment, determination of the boundary sample is performed by calculating the HIK of histogram features to calculate the reliability of an input sample, but a kernel function may also be used instead. For example, as discussed in "Efficient Additive Kernels via Explicit Feature Maps" by A. Vedaldi and A. Zisserman, Proceedings of the IEEE Conference on Computer Vision and Pattern Recognition (CVPR2010), the HIK is a type of an additive kernel, which is a function that can be represented as a sum of a predetermined positive definitive function calculated for each bin of the histogram feature, and additive kernels other than HIK may also be used. Such kernel functions include a chi-square kernel and Hellinger's kernel, for example. In this case, a kernel function to be used instead is calculated without using the first HIK calculation unit 112 and the second HIK calculation unit 121. Moreover, in this case, the process can be further accelerated by the method discussed in the document mentioned above.

According to the present exemplary embodiment, the recognition process is performed by extracting one feature amount from the entire face, but characteristic partial regions, such as eyes, mouth, and nose, may be extracted from the face image, and the reliability of a feature amount input with respect to each region may be calculated by Equation (6). In this case, the obtained results are merged, and identification of a face is performed in step S704. Face recognition that is more robust to a change of a look of a face occurring depending on the orientation or the expression of the face or a shade, compared to a case of performing recognition by extracting a feature amount from the entire face, is enabled.

The essence of the present invention resides in performing an identification process with high accuracy by using a boundary sample in a case where the number of registered samples is small, and achieving a stable reliability in that case. Accordingly, an exemplary embodiment where the present invention is applied to individual identification through face has been described, but the present invention may also be applied to recognition of objects other than face.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present exemplary embodiments described above, even if a plurality of objects resembling each other is registered, object recognition can be performed with high accuracy based on a plurality of registered images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183456, filed Aug. 22, 2012, which is hereby incorporated by reference herein in its entirety.

What is claimed is:

1. An image recognition apparatus comprising:
    an acquisition unit configured to acquire an object image;
    a feature extraction unit configured to extract a plurality of feature amounts by extracting respective histogram features from a plurality of regions in the object image acquired by the acquisition unit;
    a first function calculation unit configured to calculate, as a group of training samples, values of a first kernel function for combinations of feature amounts calculated for bins of the histogram features extracted by the feature extraction unit from a plurality of object images including a same object;
    a determination unit configured to determine a training sample that is present near a boundary of a class containing the group of training samples by checking a condition for the values of the first kernel function, as a boundary sample;
    a registration unit configured to register the boundary sample;
    a second function calculation unit configured to calculate values of a second kernel function for combinations of the feature amount of the histogram feature extracted by the feature extraction unit from the object image of a recognition target acquired by the acquisition unit and respective boundary samples of a plurality of classes registered by the registration unit;
    a reliability calculation unit configured to calculate a reliability for each class with respect to the object image of the recognition target based on the values of the second kernel function; and
    an identification unit configured to identify a class of the recognition target based on the reliability for each class calculated by the reliability calculation unit.

2. The image recognition apparatus according to claim 1, wherein the class is a hypersphere defined by Support Vector Data Description (SVDD).

3. The image recognition apparatus according to claim 1, wherein the acquisition unit acquires the object image from frames forming a moving image, and
    wherein the feature extraction unit extracts, as a training sample, a feature amount from an object image of a same object in each frame forming the moving image.

4. The image recognition apparatus according to claim 1, wherein the object image is a face image of a person.

5. The image recognition apparatus according to claim 1, wherein the registration unit registers the boundary sample with a parameter for determining the boundary sample.

6. The image recognition apparatus according to claim 1, wherein the first function calculation unit calculates the values of the first kernel function that can be represented as a sum of a predetermined positive definitive function calculated for each bin of the histogram feature.

7. The image recognition apparatus according to claim 1, wherein the feature extraction unit normalizes the histogram feature.

8. An image recognition method comprising:
    acquiring an object image;
    extracting a plurality of feature amounts by extracting respective histogram features from a plurality of regions in the acquired object image;

calculating, as a group of training samples, values of a first kernel function for combinations of feature amounts calculated for bins of the histogram features extracted in the extracting from a plurality of object images including a same object;

determining a training sample that is present near a boundary of a class containing the group of training samples by checking a condition for the values of the first kernel function, as a boundary sample;

registering the boundary sample;

calculating values of a second kernel function for combinations of the feature amount of the histogram feature extracted from the acquired object image of a recognition target and respective boundary samples of a plurality of classes;

calculating a reliability for each class with respect to the object image of the recognition target based on the values of the second kernel function; and identifying a class of the recognition target based on the reliability for each class calculated in the calculating the reliability.

9. A non-transitory computer-readable storage medium storing a program for causing a computer to execute:

acquiring an object image;

extracting a plurality of feature amounts by extracting respective histogram features from a plurality of regions in the acquired object image;

calculating, as a group of training samples, values of a first kernel function for combinations of feature amounts calculated for bins of the histogram features extracted in the extracting from a plurality of object images including a same object;

determining a training sample that is present near a boundary of a class containing the group of training samples by checking a condition for the values of the first kernel function, as a boundary sample;

registering the boundary sample;

calculating values of a second kernel function for combinations of the feature amount of the histogram feature extracted from the acquired object image of a recognition target and respective boundary samples of a plurality of classes;

calculating a reliability for each class with respect to the object image of the recognition target based on the values of the second kernel function; and identifying a class of the recognition target based on the reliability for each class calculated in the calculating the reliability.

* * * * *